United States Patent
Tsai et al.

(10) Patent No.: US 7,864,837 B2
(45) Date of Patent: Jan. 4, 2011

(54) MOTION ESTIMATION METHOD UTILIZING A DISTANCE-WEIGHTED SEARCH SEQUENCE

(75) Inventors: Chang-Che Tsai, Hsinchu Hsien (TW);
Chih-Hsin Lin, Hsinchu Hsien (TW);
Yi-Fang Lee, Hsinchu Hsien (TW);
Tzu-Yi Chao, Hsinchu Hsien (TW)

(73) Assignee: PixArt Imaging Incorporation, Hsin-Chu (TW)

( * ) Notice: Subject to any disclaimer, the term of this patent is extended or adjusted under 35 U.S.C. 154(b) by 1344 days.

(21) Appl. No.: 11/365,573

(22) Filed: Mar. 1, 2006

(65) Prior Publication Data

US 2006/0203914 A1    Sep. 14, 2006

(30) Foreign Application Priority Data

Mar. 9, 2005    (TW)    ............... 94107125 A (51) Int. Cl.
   *H04B 1/66*    (2006.01)
(52) U.S. Cl. ...................................... 375/240
(58) Field of Classification Search .................. 375/240
   See application file for complete search history.

(56) References Cited

U.S. PATENT DOCUMENTS

| | | | | |
|---|---|---|---|---|
| 4,771,331 | A * | 9/1988 | Bierling et al. | 375/240.01 |
| 6,418,166 | B1 * | 7/2002 | Wu et al. | 375/240.12 |
| 6,611,561 | B1 * | 8/2003 | Hannuksela et al. | 375/240.27 |
| 6,741,655 | B1 * | 5/2004 | Chang et al. | 375/240.26 |
| 2003/0081677 | A1 * | 5/2003 | Segman | 375/240.13 |
| 2003/0231712 | A1 | 12/2003 | Malayath et al. | |
| 2006/0088102 | A1 * | 4/2006 | Lee et al. | 375/240.16 |
| 2006/0098878 | A1 * | 5/2006 | Jojic et al. | 382/215 |
| 2007/0092006 | A1 * | 4/2007 | Malayath | 375/240.16 |

FOREIGN PATENT DOCUMENTS

CN    1663280 A    6/2003

OTHER PUBLICATIONS

Chang, "VideoQ: An Automated Content Based Video Search System Using Visual Cues", ACM 1997.*
Su, "Motion estimation using MSD-first processing," IEE Proceedings on Circuits, Devices and Systems, vol. 150, Issue: 2, Publication Year: 2003, pp. 124-133.*
Shi, "Motion segmentation and tracking using normalized cuts" IEEE 1998 Sixth International Conference on Computer Vision, Publication Year: 1998, pp. 1154-1160.*
Shi, "Normalized cuts and image segmentation" in Proc. IEEE Conference Computer Vision and Pattern Recognition, pp. 731-737, 1997.*

(Continued)

*Primary Examiner*—Juan A Torres
(74) *Attorney, Agent, or Firm*—Tung & Associates (57) ABSTRACT

A motion estimation method for a succession of frames in a digital coding system includes: with reference to a first block in a first frame, searching a second frame for a second block that corresponds to the first block; and estimating a motion vector of the first block with respect to the second block in the second frame. Blocks in the second frame are searched according to a distance-weighted search sequence starting from a candidate origin block. In view of the radiating characteristics of motion vectors, the distance-weighted search sequence can save unnecessary search time.

7 Claims, 5 Drawing Sheets

OTHER PUBLICATIONS

Yoshida, "Distance metric for motion vector histograms based on human perceptual characteristics"2002 International Conference on Image Processing, 2002, Proceedings, vol. 1, Publication Year: 2002, pp. I-904-I-907 vol. 1.*

Hafner, "Efficient color histogram indexing for quadratic form distance functions" IEEE Transactions on Pattern Analysis and Machine Intelligence, Issue Date: Jul. 1995 vol. 17 Issue: 7 on pp. 729-736.*

* cited by examiner

MOTION ESTIMATION METHOD UTILIZING A DISTANCE-WEIGHTED SEARCH SEQUENCE

CROSS-REFERENCE TO RELATED APPLICATION

This application claims priority of Taiwanese Application No. 094107125, filed on Mar. 9, 2005.

BACKGROUND OF THE INVENTION

1. Field of the Invention

The invention relates to a method for motion estimation in video coding, more particularly to motion estimation methods utilizing a distance-weighted search sequence to find a best-matched motion vector.

2. Description of the Related Art

Figure 1:
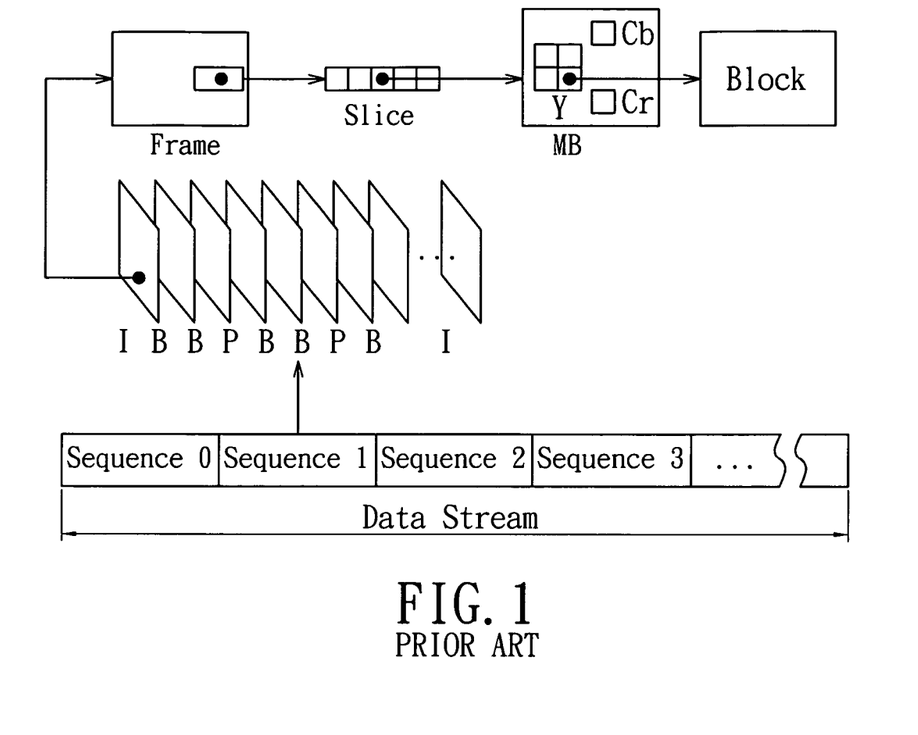
FIG. 1 is a schematic diagram showing the data structure of an MPEG coded video.

Referring to FIG. 1, the data structure of a data stream of an MPEG coded video is shown to be formed from one or more sequences. Each sequence includes a group of pictures (GOP), which refers to a group consisting of a plurality of pictures or frames. These pictures or frames can be classified into three types, i.e., intra-coded frames (I frame), predictive-coded frames (P frame), and bi-directionally predictive-coded frames (B frame), according to their attributes.

Each of the aforesaid frames can be encoded. Generally, I frames are used as cut-in points during video compression. A P frame can be predicted through motion estimation using an I frame or another P frame as a reference frame, whereas a B frame can be predicted from the motion vectors generated by both an I frame and a P frame or by two P frames which serve as reference frames. Thus, by playing the frames successively, an MPEG video can be presented to a user.

Each frame can be divided into a plurality of slices. Each slice is further divided into a plurality of macroblocks (MB). Each macroblock is composed of four luminance blocks and a plurality of chrominance blocks. Each block is defined as the smallest coded unit of the MPEG data structure. The corresponding inverse operation of motion compensation in MPEG compression standards is motion estimation. The most direct way of implementing motion estimation is to record the luminance and chrominance of each pixel of a macro block or a block, and match all blocks/macroblocks in the search area to find the best matched macroblock or block. This method is called full search.

With the use of motion estimation and motion compensation techniques, the blocks in a reference frame can be adjusted to become those in a current frame by using the blocks in the current frame and the best matched blocks found from the reference frame for calculating motion vectors and differential data. Blocks can be shifted to proper positions according to the motion vectors, whereas the differential data provide changes in the luminance, chrominance, and saturation values. Since it is not necessary to record a large amount of redundant data, the amount of stored data can be reduced to thereby achieve the object of data compression.

Figure 2:
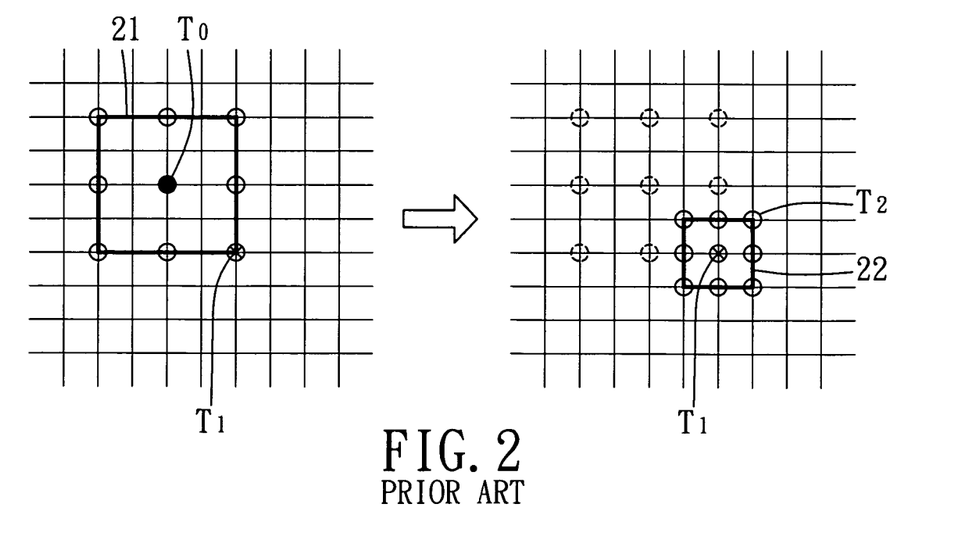
FIG. 2 is a schematic diagram showing a conventional Three-Step Search (TSS) determination scheme.

Referring to FIG. 2, the aforesaid method of finding a best matched block from a reference frame can be exemplified using a conventional determination scheme, i.e., the Three-Step Search (TSS). First, the center of a search area 21 to be searched is defined as an origin point $T_0$, and eight points on the boundary of the search area 21 serve as check points. Supposing the size of the search area 21 is 4×4, and a check point $T_1$ at the lower right corner of the search area 21 is the best matched point, the check point $T_1$ is chosen as the new center, and the search area 21 is reduced to a new search area 22 with a size of 2×2. Finally, when a check point $T_2$ at the upper right corner of the search area 22 is found to be the new best matched point, a motion vector value can be estimated thereon.

Figure 3A:
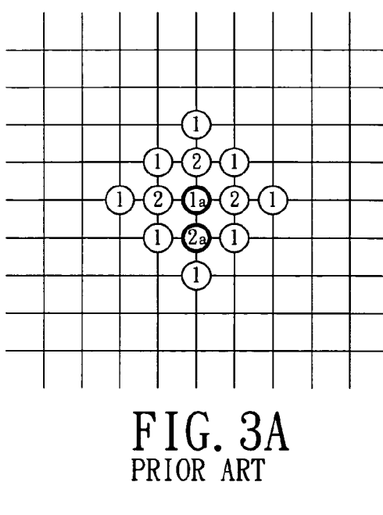
FIGS. 3A and 3B are schematic diagrams to illustrate a conventional Diamond Search (DS) determination scheme.
Figure 3B:
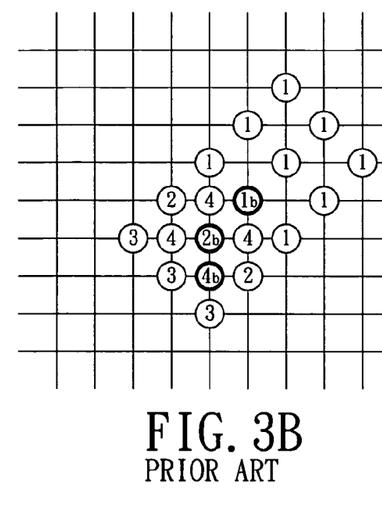

Referring to FIG. 3, another conventional determination scheme is the Diamond Search (DS), in which a search area in the shape of a diamond is searched. This search scheme involves the following steps:

Step 1: An origin point and eight other points that surround the origin point and that lie on the boundary of a diamond-shaped search area are found so that there are altogether nine search points. If the best matched point is found to be at the center of the search area, the flow proceeds to step 4. On the other hand, if the best matched point is found to be on the boundary of the search area, the flow proceeds to step 2.

Step 2: The search is continued using another set of check points on the boundary of another diamond-shaped search area that is centered at the best matched point found in step 1.

Step 3: If the best matched point is still found to be at the center of the new search area, step 4 is performed. On the other hand, if the new best matched point is found to be on the boundary of the new search area, step 2 is repeated.

Step 4: The search area is reduced to a smaller diamond. The search is stopped when the ideal point is found.

The aforesaid scheme is further illustrated with reference to FIG. 3A. In step 1, the initial best matched point is found to be at the center (1a) of the search area, and step 4 is therefore performed in a reduced search area, a smaller diamond. The search is ended when the ideal point (2a) is located.

Referring to FIG. 3B, when the initial best matched point (1b) in step 1 is found to be located on the boundary of the search area, step 2 is performed to form another diamond-shaped search area centered at the initial best matched point (1b). Then step 3 is performed. Since the new best matched point (2b) is found to lie on the boundary of the new search area, step 2 is repeated to form yet another diamond-shaped search area centered at the new best matched point (2b). When it is found that the latest best matched point is located at the center of the search area, step 4 is performed in a reduced search area, a smaller diamond. The search is ended when the ideal point (4b) is found.

Figure 4A:
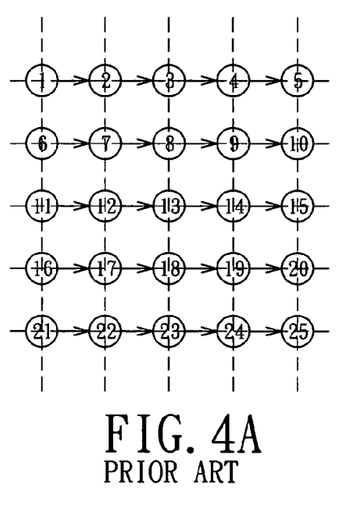
FIG. 4A is a schematic diagram showing a conventional raster search pattern.
Figure 4B:
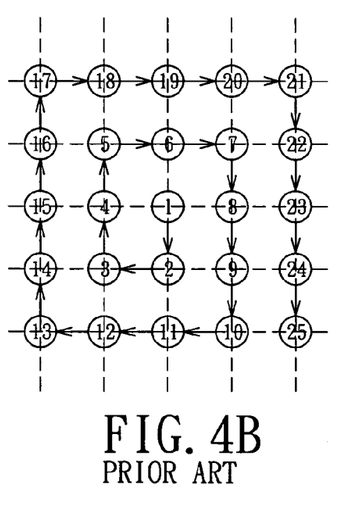
FIG. 4B is a schematic diagram showing a conventional spiral search pattern.

Regardless of which conventional determination scheme is used, a raster search order (see FIG. 4A) or a rectangular spiral search order (see FIG. 4B) may be employed. The so-called raster search order is to find the best matched point from a predefined search area by searching from left to right and then from top to bottom. The so-called rectangular spiral search pattern begins at the center of a predefined search area, and moves outward in a spiral fashion to cover each check point.

SUMMARY OF THE INVENTION

The object of the present invention is to provide a motion estimation method that utilizes a distance-weighted search sequence so as to enhance search efficiency.

According to this invention, a motion estimation method comprises: a) with reference to a first block in a first frame, searching at least one portion of a second frame for a second block that corresponds to the first block; and b) estimating a motion vector of the first block with respect to the second block in the second frame.

In step a), all blocks in the at least one portion of the second frame are searched according to a distance-weighted search sequence starting from a candidate pre-determined origin block.

Preferably, step a) includes:

calculating weighted distances of candidate blocks in the second frame based on the following equation:

weighted distance=$H(u, v)$, where H is a predetermined weighted distance function, u is a U-axis coordinate distance of the candidate block from the candidate origin block, and v is a V-axis coordinate distance of the candidate block from the candidate origin block, the U-axis and V-axis constituting bases of a plane; and searching the second frame in an increasing order of the calculated weighted distances of the candidate blocks.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 5:
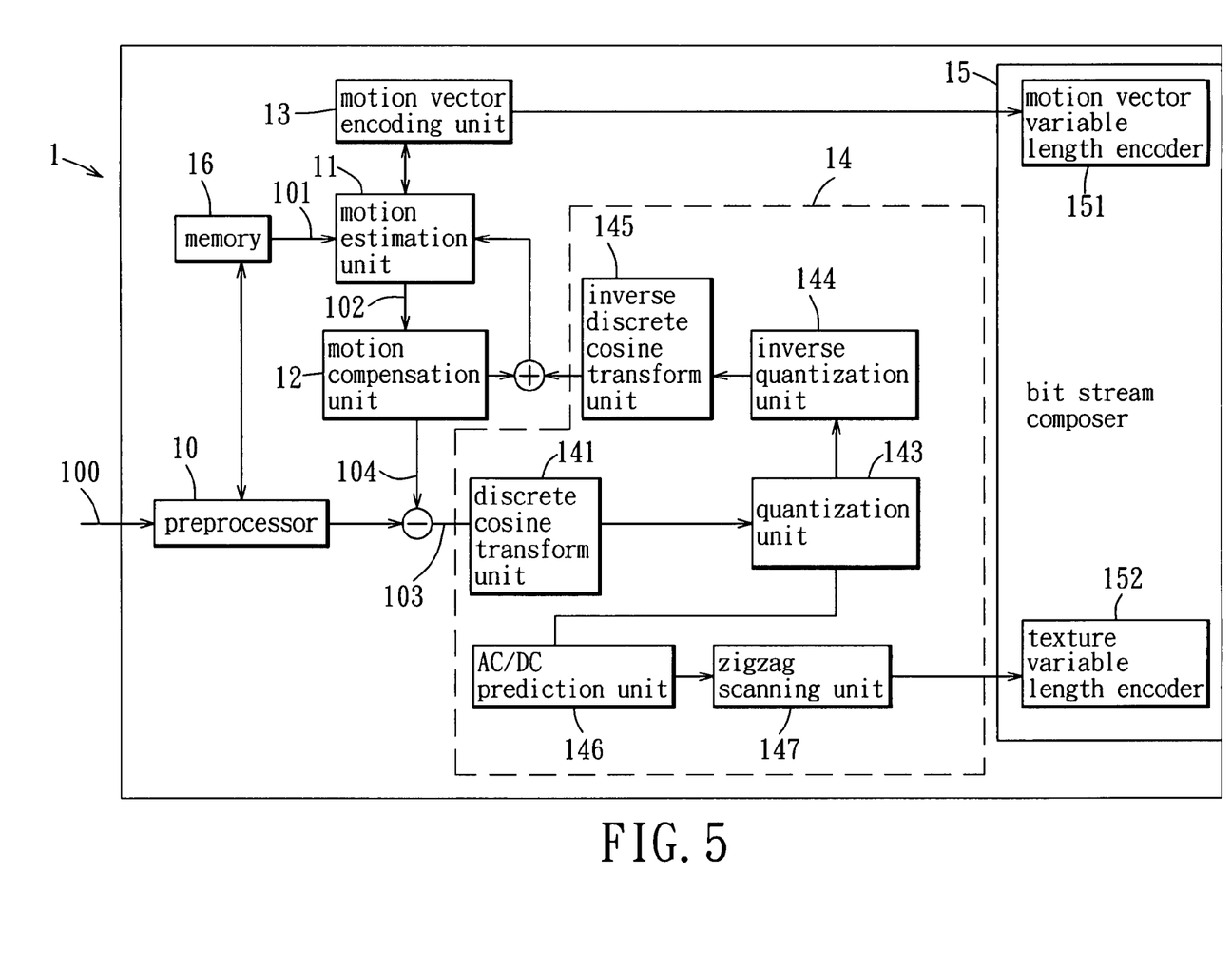
FIG. 5 is a schematic circuit block diagram of a video coding device for performing MPEG video coding, the video coding device being used to implement a motion estimation method according to the present invention.

Referring to FIG. 5, a system for implementing the motion estimation method according to the present invention is shown to be embodied in a video coding device 1 capable of MPEG video compression. However, it should be apparent to those skilled in the art that the present invention may also be applied to a processing system that performs functions similar to video compression.

The video coding device 1 includes a preprocessor 10, a motion estimation unit 11, a motion compensation unit 12, a motion vector encoding unit 13, a texture encoding unit 14, a bit stream composer 15, and a memory 16.

When an image 100 is input into the video coding device 1, the preprocessor 10 initially defines the data of each macroblock in a given frame for temporary storage in the memory 16. Thereafter, the motion estimation unit 11 calculates the data of the macroblocks in the given frame of the image 100, e.g., motion vector data 102 of the blocks in the entire frame can be obtained by calculating data 101 of the corresponding blocks in two adjacent frames for subsequent input into the motion compensation unit 12. The motion compensation unit 12 retrieves macroblock data from a preceding or succeeding frame using the motion vectors so as to obtain reference data 104. By subtracting the reference data 104 obtained by the motion compensation unit 12 from the macroblock data of the image 100 obtained by the preprocessor 10, differential data 103 can be obtained. The differential data 103 undergo computation by the texture encoding unit 14 to obtain compressed texture and reconstructed reference data.

The texture encoding unit 14 has a discrete cosine transform unit 141 which applies discrete cosine transform (DCT) to the pixels of each block to convert the DCT-pixel data from the spatial domain to the frequency domain. Then, a quantization unit 143 is employed to perform a quantization step to quantize DCT coefficients, and to remove high-frequency portions. Moreover, an inverse quantization unit 144 and an inverse discrete cosine transform unit 145 are used to perform inverse quantization and inverse discrete cosine transform computations for feedback to the motion estimation unit 11. The motion vector encoding unit 13 encodes and outputs each of the motion vectors to a variable length encoder 151 of the bit stream composer 15.

Furthermore, an alternating current/direct current (AC/DC) prediction unit 146 is required to remove redundant information of blocks in the same frame. A zigzag scanning unit 147 is then used to perform a zigzag scan to rearrange the quantized DCT coefficients such that the low-frequency coefficients are placed in the front whereas the high-frequency coefficients are placed in the back. Thereafter, the rearranged DCT coefficients are subjected to run length coding (RLC). Finally, another variable length encoder 152 of the bit stream composer 15 is used to perform variable length coding (VLC) on both the low-frequency coefficients and the high-frequency coefficients for composition by the bit stream composer 15, thereby completing output in the MPEG compression format.

Figure 6:
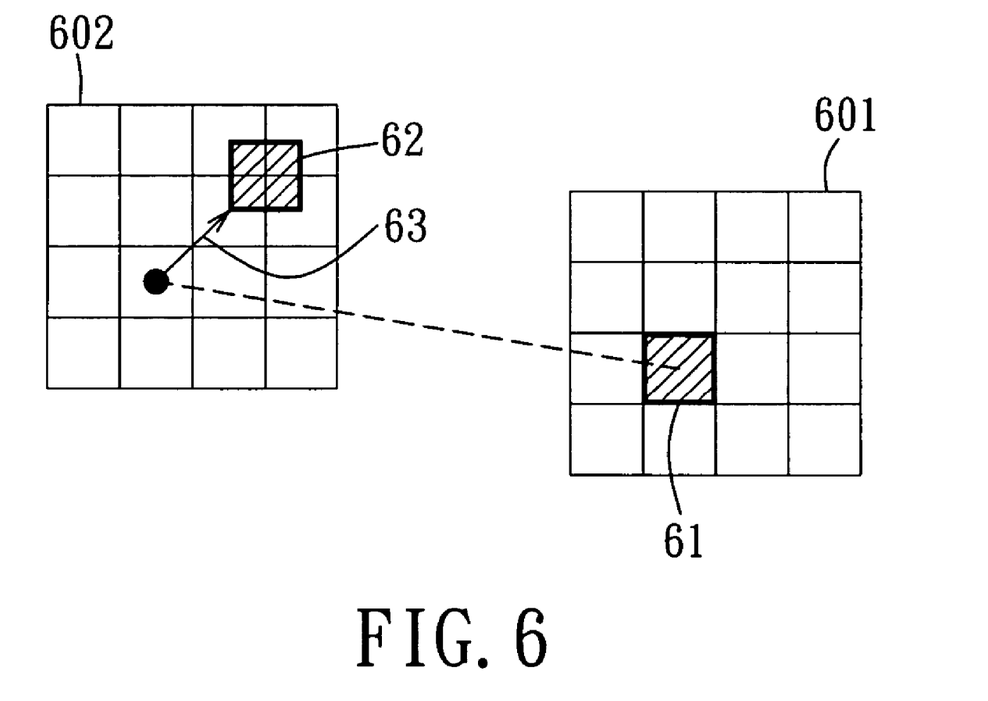
FIG. 6 is a brief illustration to illustrate the estimation of a motion vector in the motion estimation method according to the present invention.

Referring to FIGS. 5 and 6, three preferred embodiments of the motion vector estimation method utilizing a distance-weighted search sequence according to this invention are all implemented in the motion estimation unit 11 of the video coding device 1. It should be apparent to those skilled in the art that the concept of the present invention can be applied to commonly used determination schemes, such as Full Search, Diamond Search, Three-Step Search, Four-Step Search, etc.

Referring to FIG. 6, in the method of this invention, with reference to a first block 61 in a first frame 601 (also referred to as a current frame), at least a portion of a second frame 602 (also referred to as a reference frame) adjacent to the first frame 601 is searched to find a second block 62 corresponding to the first block 61. A motion vector 63 of the first block 61 is then estimated with respect to the second block 62. In the method, all blocks in the second frame 602 are searched according to a distance-weighted search sequence starting from a candidate origin block.

In the method of this invention, when searching for the second block 62, weighted distances of candidate blocks in the second frame 602 are calculated based on the following general equation:

weighted distance=$H(u,v)$     Equation 1 where H is a predetermined weighted distance function, u is a U-axis coordinate distance of the candidate block from the candidate origin block, and v is a V-axis coordinate distance of the candidate block from the candidate origin block. The U-axis and V-axis constitute bases of a plane. The second frame 602 is then searched in an increasing order of the calculated weighted distances of the candidate blocks.

Figure 7:
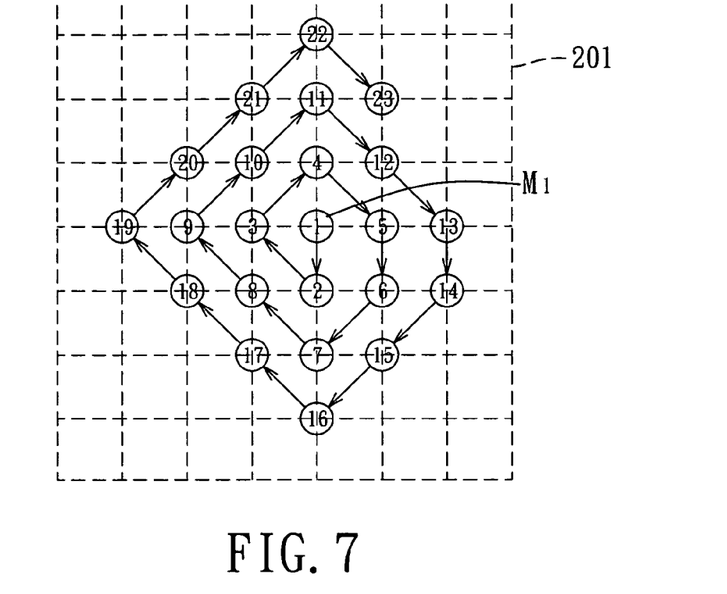
FIG. 7 is a schematic diagram to illustrate a distance-weighted search sequence adopted in the first preferred embodiment of a motion estimation method according to the present invention.

FIG. 7 illustrates the first preferred embodiment of a motion vector estimation method according to this invention. In this embodiment, calculation of the weighted distances is based on the following Equation 2, where x is an X-axis coordinate distance of the candidate block from the candidate origin block, and y is a Y-axis coordinate distance of the candidate block from the candidate origin block.

weighted distance=(absolute (x)+absolute (y))    Equation 2

In FIG. 7, the candidate origin block is at a center point $M_1$ of a search area 201, and the distance-weighted search sequence proceeds in an increasing order of the calculated weighted distances of the candidate blocks. For instance, from the center point $M_1$, the search sequence continues through four points on the boundary of a smaller rhombus-shaped area. If the best matched block is not found, the search sequence continues in a rhombic spiral pattern expanding outward to unsearched candidate blocks until the best matched block is found.

Figure 8:
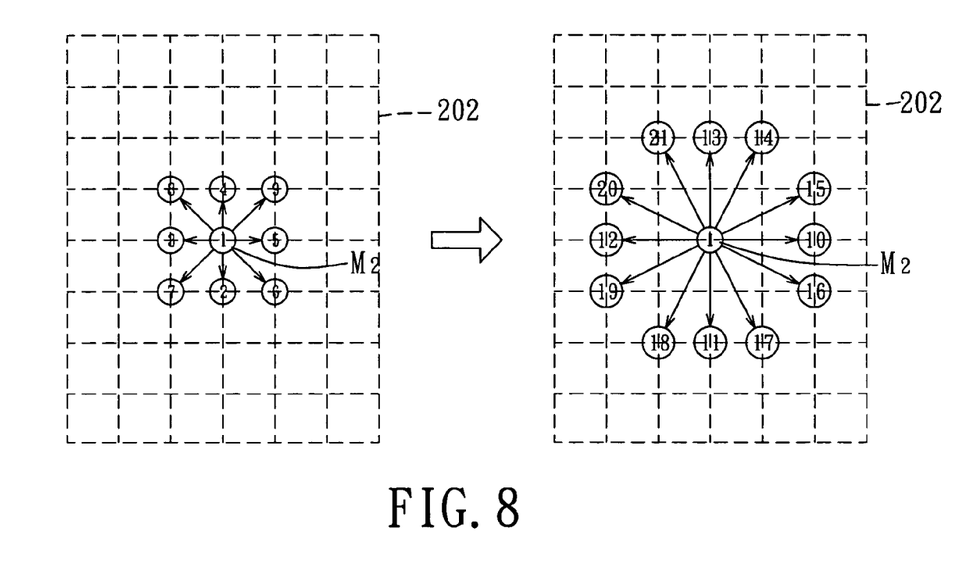
FIG. 8 is a schematic diagram to illustrate a distance-weighted search sequence adopted in the second preferred embodiment of a motion estimation method according to the present invention.

FIG. 8 illustrates the second preferred embodiment of a motion vector estimation method according to the present invention. In this embodiment, calculation of the weighted distances is based on the following Equation 3, where x is an X-axis coordinate distance of the candidate block from the candidate origin block, and y is a Y-axis coordinate distance of the candidate block from the candidate origin block.

weighted distance=$(sqrt(x^2+y^2))$    Equation 3

In FIG. 8, the candidate origin block is at a center point $M_2$ of a search area 202, and the distance-weighted search sequence proceeds in an increasing order of the calculated weighted distances of the candidate blocks, e.g., starting from $M_2$ (i.e., block 1), onward to four blocks (i.e., blocks 2, 3, 4, 5) around and closest to $M_2$, and further to four other blocks (i.e., blocks 6, 7, 8, 9) next closest to $M_2$. If the best matched block is not found, the search sequence is expanded outward to unsearched candidate blocks closest to $M_2$ (e.g., blocks 10, 11, 12, and 13), then to next closest unsearched blocks 14, 15, 16, 17, 18, 19, and 20, and so on and so forth, until the best matched block is located.

In the third preferred embodiment of this invention, weighted distances of candidate blocks are calculated based on the following Equation 4:

Weighted distance=$F(u)+G(v)$ where u=absolute(x), v=absolute(y), F(u) and G(v) are each obtained by looking up a corresponding pre-established look-up table, x is an X-axis coordinate distance of the candidate block from the candidate origin block, and y is a Y-axis coordinate distance of the candidate block from the candidate origin block. Like the previous embodiments, the second frame 602 (see FIG. 6) is searched in an increasing order of the calculated weighted distances of the candidate blocks. Examples of the aforementioned look-up table are shown in Table 1 and Table 2 below. Besides, the corresponding look-up tables for F(u) and G(v) maybe identical, i.e., F(●)=G(●).

TABLE 1

| u | F(u) |
|---|------|
| 0 | 1 |
| 1 | 3 |
| 2 | 4 |
| 3 | 5 |
| 4 | 7 |
| 5 | 8 |
| 6 | 8 |

TABLE 1-continued

| u | F(u) |
|---|------|
| 7 | 8 |
| 8 | 10 |
| 9 | 10 |
| 10 | 10 |
| 11 | 11 |
| 12 | 11 |
| 13 | 11 |
| 14 | 11 |
| 15 | 11 |

TABLE 2

| u | F(u) |
|---|------|
| 0 | 1 |
| 1 | 4 |
| 2 | 7 |
| 3 | 8 |
| 4 | 10 |
| 5 | 10 |
| 6 | 11 |
| 7 | 11 |
| 8 | 11 |
| 9 | 11 |
| 10 | 11 |
| 11 | 11 |
| 12 | 11 |
| 13 | 12 |
| 14 | 12 |
| 15 | 12 |

It is noted that the number of entries in Tables 1 and 2 can be increased as desired and should not be limited to that of the above tables. In addition, the unit of increment in the values of u and v may be an integer or a fraction, such as ½, ¼ or ⅛, for indexing the look-up tables.

In sum, the motion estimation method utilizing a distance-weighted search sequence according to the present invention is based on the principle that motion vectors have radiating characteristics. Therefore, compared to conventional search patterns, the distance-weighted search sequence according to the present invention can find best matched blocks faster, and saves unnecessary search time, thereby rendering the estimation of motion vectors more efficient.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A motion estimation method performed by a processor for a succession of frames in a digital coding system, comprising the following steps:
    a) with reference to a first block in a first frame, searching within at least a portion of a second frame for a second block that corresponds to the first block; and
    b) estimating, using the processor, a motion vector of the first block with respect to the second block in at least the portion of the second frame;
    wherein step a) includes:
    calculating weighted distances of candidate blocks from a candidate origin block in the second frame based on the following equation:

weighted distance=$H(u, v)$, where H is a predetermined weighted distance function, u is a U-axis coordinate distance of the candidate block from the candidate origin block, and v is a V-axis coordinate distance of the candidate block from the candidate origin block, the U-axis and V-axis constituting bases of a plane; and searching the second frame in an increasing order of the calculated weighted distances of the candidate blocks, starting from a candidate origin block.

2. The motion estimation method as claimed in claim 1, wherein step a) includes:

calculating weighted distances of candidate blocks in the second frame based on the following equation:

weighted distance=(absolute($x$)+absolute($y$)), where x is an X-axis coordinate distance of the candidate block from the candidate origin block, and y is a Y-axis coordinate distance of the candidate block from the candidate origin block; and searching the second frame in an increasing order of the calculated weighted distances of the candidate blocks.

3. The motion estimation method as claimed in claim 1, wherein step a) includes:

calculating weighted distances of candidate blocks in the second frame based on the following equation:

weighted distance=($sqrt(x^2+y^2)$)

where x is an X-axis coordinate distance of the candidate block from the candidate origin block, and y is a Y-axis coordinate distance of the candidate block from the candidate origin block; and searching the second frame in an increasing order of the calculated weighted distances of the candidate blocks.

4. The motion estimation method as claimed in claim 1, wherein step a) includes:

calculating weighted distances of candidate blocks in the second frame based on the following equation:

weighted distance=$F(u)$+$G(v)$ where u=absolute(x), v=absolute(y), F(u) and G(v) are each obtained by looking up a corresponding pre-established look-up table, x is an X-axis coordinate distance of the candidate block from the candidate origin block, and y is a Y-axis coordinate distance of the candidate block from the candidate origin block; and searching the second frame in an increasing order of the calculated weighted distances of the candidate blocks.

5. The motion estimation method as claimed in claim 4, wherein x, y are in integer unit value.

6. The motion estimation method as claimed in claim 5, wherein x, y are in fractional unit value.

7. The motion estimation method as claimed in claim 1, wherein the distance-weighted search sequence can be applied on full search, diamond search, three-step search, and four step search.

* * * * *